(12) United States Patent
Vieira

(10) Patent No.: US 12,276,842 B2
(45) Date of Patent: Apr. 15, 2025

(54) OPTICAL TERMINATION AND DERIVATION BOX

(71) Applicant: FURUKAWA ELECTRIC LATAM S.A., Curitiba-Pr (BR)

(72) Inventor: Thiago Deconto Vieira, Curitiba-Pr (BR)

(73) Assignee: FURUKAWA ELECTRIC LATAM S.A., Curitiba-Pr (BR)

( * ) Notice: Subject to any disclaimer, the term of this patent is extended or adjusted under 35 U.S.C. 154(b) by 167 days.

(21) Appl. No.: 17/775,291

(22) PCT Filed: Nov. 6, 2020

(86) PCT No.: PCT/BR2020/050459
§ 371 (c)(1),
(2) Date: May 7, 2022

(87) PCT Pub. No.: WO2021/087592
PCT Pub. Date: May 14, 2021

(65) Prior Publication Data
US 2022/0390675 A1    Dec. 8, 2022

(30) Foreign Application Priority Data

Nov. 7, 2019  (BR) .......................... 1020190233850

(51) Int. Cl.
G02B 6/255 (2006.01)
G02B 6/24 (2006.01)
G02B 6/26 (2006.01)

(52) U.S. Cl.
CPC ........... G02B 6/2553 (2013.01); G02B 6/241 (2013.01); G02B 6/262 (2013.01)

(58) Field of Classification Search
CPC ...... G02B 6/2553; G02B 6/241; G02B 6/262; G02B 6/4447; G02B 6/44465; G02B 6/445; G02B 6/4442
See application file for complete search history.

(56) References Cited

U.S. PATENT DOCUMENTS 6,226,434 B1   5/2001  Koshiyama et al.
9,310,579 B2   4/2016  Massuda
(Continued)

FOREIGN PATENT DOCUMENTS

BR   102015023980 A2   3/2017
BR   102019014363 A2   1/2021
(Continued)

OTHER PUBLICATIONS

International Search Report and Written Opinion in International Application No. PCT/BR2020/050459 dated Jan. 26, 2021.

*Primary Examiner* — Michael P Mooney
(74) *Attorney, Agent, or Firm* — Dinsmore & Shohl LLP

(57) ABSTRACT

A box having a base and a lid hinged to the base and displaceable between a closed position and an open position. A peripheral wall of the base is provided with two lateral openings each flanked by two inclined recesses and each closed by a sealing grommet for the passage of at least one multi-fiber optical cable and which is pressed into the lateral opening to receive a sealing gasket carried by the lid. A splitter accommodation tray has a front face attached to the top wall of the lid and carrying splitter and/or fiber accommodation means, and a rear face covered by a splitter protective plate. Each splitter and/or fiber accommodation means is connectable to a fiber extension of an optical cable received in the base and to fiber extensions connected to output adapters mounted on a peripheral wall of the lid and connected to connectors of terminal cables.

14 Claims, 11 Drawing Sheets

(56) References Cited

U.S. PATENT DOCUMENTS

| | | |
|---|---|---|
| 9,575,279 B1 | 2/2017 | Yoshizawa |
| 2005/0175307 A1* | 8/2005 | Battey .................... G02B 6/445 385/135 |
| 2009/0185782 A1* | 7/2009 | Parikh .................. G02B 6/4442 385/135 |
| 2009/0238531 A1 | 9/2009 | Holmberg et al. |
| 2010/0189404 A1 | 7/2010 | Rudenick et al. |
| 2012/0230644 A1 | 9/2012 | Marmon et al. |
| 2018/0252887 A1 | 9/2018 | Coenegracht et al. |

FOREIGN PATENT DOCUMENTS

| | | | |
|---|---|---|---|
| EP | 3542199 A1 | 1/2024 | |
| KR | 102039185 B1 | 10/2019 | |
| WO | 0231546 A2 | 4/2002 | |
| WO | 2019025010 A1 | 2/2019 | |
| WO | 2019129345 A1 | 7/2019 | |
| WO | 2019178664 A1 | 9/2019 | |
| WO | WO 2019178664 * | 9/2019 | ............... G02B 6/44 |

* cited by examiner

OPTICAL TERMINATION AND DERIVATION BOX

CROSS-REFERENCE TO RELATED APPLICATIONS

The present application is the National Phase entry of International Patent Application No. PCT/BR2020/050459 filed Nov. 6, 2020, which claims priority to Brazilian Patent Application No. 10 2019 023385 0 filed Nov. 7, 2019.

TECHNICAL FIELD

The present disclosure refers to a termination and derivation box (splice) of optical cables, to be applied to fiber optic aerial networks called FTTH ("fiber to the home"), to protect an optical splice ("splitter") between any one of the optical fibers of a multifiber distribution cable received in the box and multiple optical termination cables ("drop" cables), and/or optical splices by fusion between any one of the optical fibers of said distribution cable and the optical fibers of a corresponding optical derivation cable (continuation multi-fiber optical cable) or the optical fiber of a corresponding optical termination cable ("drop" cable).

BACKGROUND

The fiber optic networks require the provision of splice points and termination points of user activation, which are protected by termination and derivation boxes, usually installed externally, aerial and fixed to the strand, in a post, on the front of a building, or in a junction box or in a subterranean box.

At a splicing point, for example, any one of the fibers of a distribution cable, received in a termination/derivation box, is spliced, by fusion: to a respective fiber of a derivation cable that leaves said box to reach a new splicing point or a user activation termination point; or to the optical fiber of a corresponding optical termination cable ("drop" cable).

However, at a user activation point, any one of the fibers of the optical derivation cable arriving at an aerial termination box may be submitted to a "splitter" to provide termination cables directed to final users of the network. The fibers of the optical derivation cable, which arrive at a termination box, but which are not connected to a respective termination cable ("drop" cable), may pass through the box, unchanged or spliced to a new length of a continuation cable, to proceed towards a new splice or an user activation point, as commented above.

These termination boxes should be constructed to receive at least one multi-fiber distribution cable, and to release the optional output of one or more derivation cables and also of a plurality of termination cables ("drop"), requiring internal accommodation for splices by fusion, for "splitter" splices and for eventual derivation cables.

A deficiency of the known termination and derivation boxes is related to the sealing solutions used therein, which have their degree of tightness increased with their constructive complexity and consequent production costs. In some solutions, the constructive simplification leads to lower production costs and also to deficiencies in the degree of tightness of the sealing grommets in the inlets and outlets of the cables, allowing the entry of moisture and insects inside the box. In other solutions, the increase of the degree of tightness is obtained with a high constructive complexity and high and undesirable production costs.

Examples of termination boxes of the type considered herein can be found in U.S. Pat. Nos. 6,226,434, and 9,310,579.

Due to the aforementioned inconveniences, the applicant proposed, in its patent application BR 10 2019 014363-0, a termination and derivation box for optical access networks, with aerial installation, and presenting a simple and versatile construction and having a cost substantially inferior to similar boxes, with a reduced number of sealing elements to obtain a desired level of tightness and allowing its installation in a horizontal or vertical position on the strand or at the wall of a building or yet in a vertical position, directly against a post, ensuring an easy and safe handling of fiber splicing elements by the respective team of installers, without interference with the connection elements of termination cables to be handled by another team of installers, regardless of the installation position of the box.

Despite the advantages of the box object of patent application BR 10 2019 014363-0, it has a design directed to the obtention of a sufficiently high level of sealing to guarantee, for example, tightness with the box submerged in 1.0 m of water column for 7 days (sealing system IP68).

Another aspect of the aforementioned box results from the fact that all the multifiber optical cables that enter and leave the box are arranged through a sealing grommet made of elastomeric material, fitted into a recess provided at one of the sides of the box base. Thus, in case of need to change the original arrangement of the multifiber cables that arrive and/or leave the box, or to provide the maintenance of any of the cables already assembled through the sealing grommet, it is necessary to remove the single sealing grommet from its fitting and moving or even removing multifiber cables, which tends to cause deficiencies in the sealing degree of the box.

Specific inconveniences and inconveniences similar to those mentioned above can be observed in the termination box object of patent application BR 10 2015 023980-7 of the same applicant. In this previous construction, a lateral wall of the base is provided with an opening in which a panel is removably mounted, said panel being provided with openings for the passage of a distribution, extension or termination cable, and connection openings in which respective connectors are mounted to receive, each one, at one end external to the box, a movable connector of a termination cable.

In these other previous boxes of the same applicant, all cables entering and leaving the box are arranged through the removable panel, which carries the sealing elements in the multifiber cable openings and the fixed connectors for connecting the termination cables. Thus, to change the original layout of the multifiber cables that arrive and/or leave the box, or to maintain any of the cables already assembled through the sealing elements (grommets), it is necessary to remove the panel and move the multifiber cables and fiber extensions inside the box, which tends to cause deficiencies in the sealing degree not only between the removable panel and the wall of the base, but also between the sealing grommets and the multi-fiber cables.

In addition to the aspects mentioned above and more directly related to issues of sealing the box, it can be said that the known solutions do not provide a box that presents a high sealing degree and even a high degree of protection to the divisions of the fiber extensions that connect derived fibers, from the optical cables received in the box, to the connectorized fiber extensions to output adapters. In said known solutions, the elements carrying the fiber dividing means are movable by different teams that access said boxes during operations of installation and of changing the user connections.

SUMMARY

In view of the aspects discussed above, the present disclosure aims to provide a termination and derivation box for optical access of networks, aerial and/or subterranean installation, in an horizontal or vertical position on the strand or on the wall of a building or in a vertical position, directly against a post, presenting a simple, versatile construction, easy to install, with a high degree of tightness, allowing the output adapters, for connecting the user terminal cables, to be accessed without the need for opening the box and also guaranteeing an easy and safe handling of the fiber splicing elements by the respective team of installers, without interference in the fiber splitting elements and connection of termination cables to be handled by another team of installers, regardless the installation position of the box.

The derivation and termination box in question is of the type comprising: a base having a bottom wall and peripheral walls defining a leading edge; and a lid hinged to the base, having a top wall and peripheral walls defining a trailing edge carrying a sealing gasket.

According to a first aspect of the disclosure, at least one peripheral wall of the base is provided with lateral openings each flanked by two inclined recesses and each closed by a sealing grommet for the tight passage of at least one multi-fiber optical cable and having a first recessed leading edge portion and a second leading edge portion leveled with the leading edge and incorporating two lateral flaps anteriorly coplanar to the first leading edge portion and each one defining subsequently an inclined surface to be seated in a respective sloping recess of the leading edge. Each sealing grommet is pressed into the lateral opening by a shoe seated on the first leading edge portion of the grommet and secured on the leading edge of the base, wherein, on the second leading edge portion of the grommet and on its two lateral flaps, the sealing gasket is seated and compressed when the lid is closed against the base.

In accordance with another aspect of the disclosure, the box comprises a splitter accommodation tray having a front face, secured against the top wall of the lid and carrying splitter and/or fiber accommodation means, and a rear face which is covered by a plate fixed inside the lid, each splitter and/or fiber accommodation means being connectable, on the one hand, to a fiber extension derived from an optical cable received at the base and, on the other hand, to split fiber extensions, held on the side of the front face and connectorized to output adapters passing through at least one of the two opposite peripheral walls of the lid, not hinged to the base, the output adapters being externally connected to respective connectors of a terminal cable external to the box.

The construction summarized above is simple and versatile, and can be installed horizontally or vertically, also ensuring an easy and safe independent handling of the fiber splicing elements by different teams of installers and guaranteeing a high sealing degree to the box when the lid is closed.

BRIEF DESCRIPTION OF DRAWINGS

The disclosure will be hereinafter described on the basis of the accompanying drawings, given by way of example of an embodiment of the disclosure and in which.

DETAILED DESCRIPTION

Figure 1:
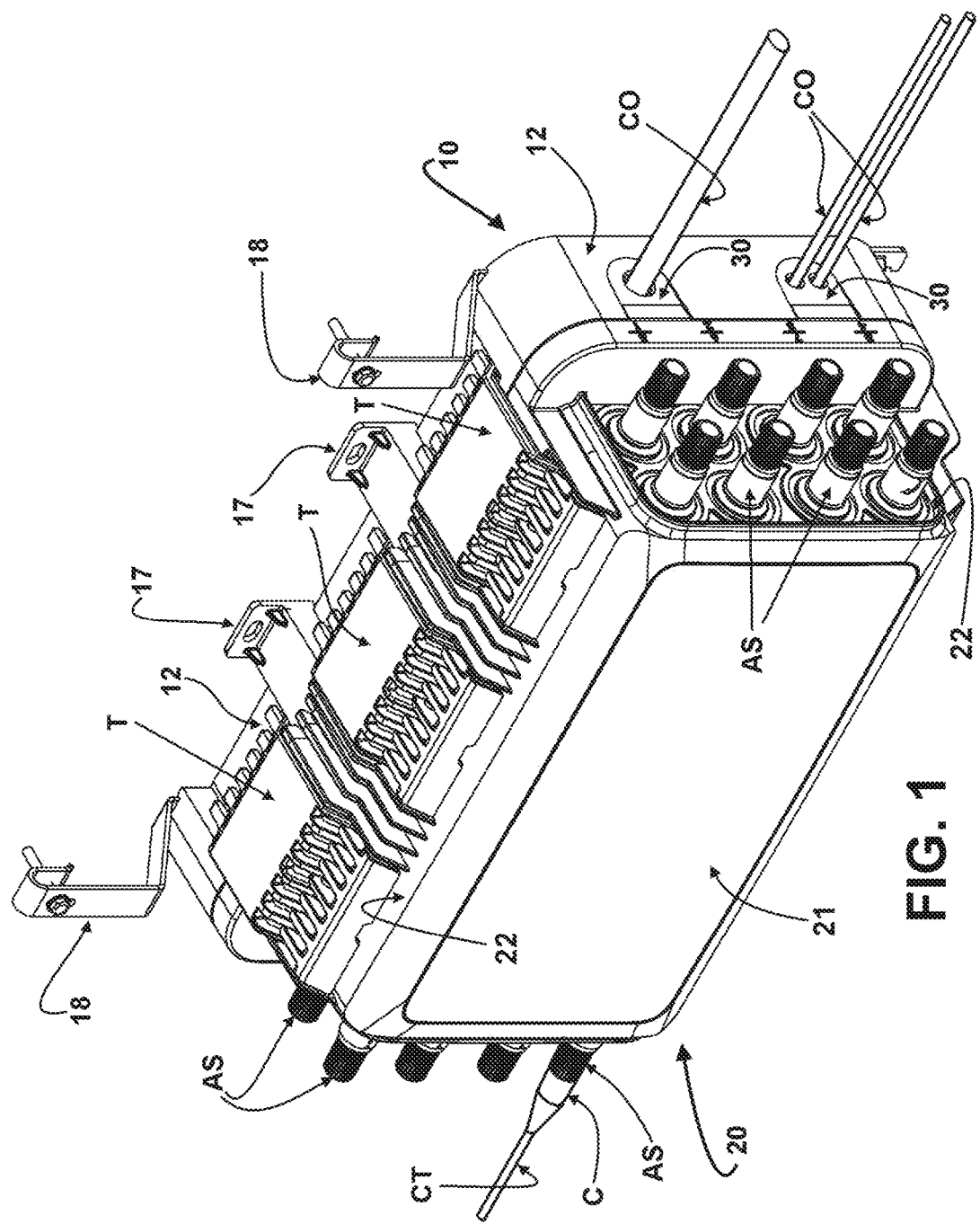
FIG. 1 represents a perspective view of the termination and derivation box of the disclosure, with its lid in a closed condition over the base and with the lateral openings of the latter each housing a sealing grommet that can be provided with one or more transversal holes for a tight and sealed passage of a corresponding distribution or derivation cable.
Figure 2:
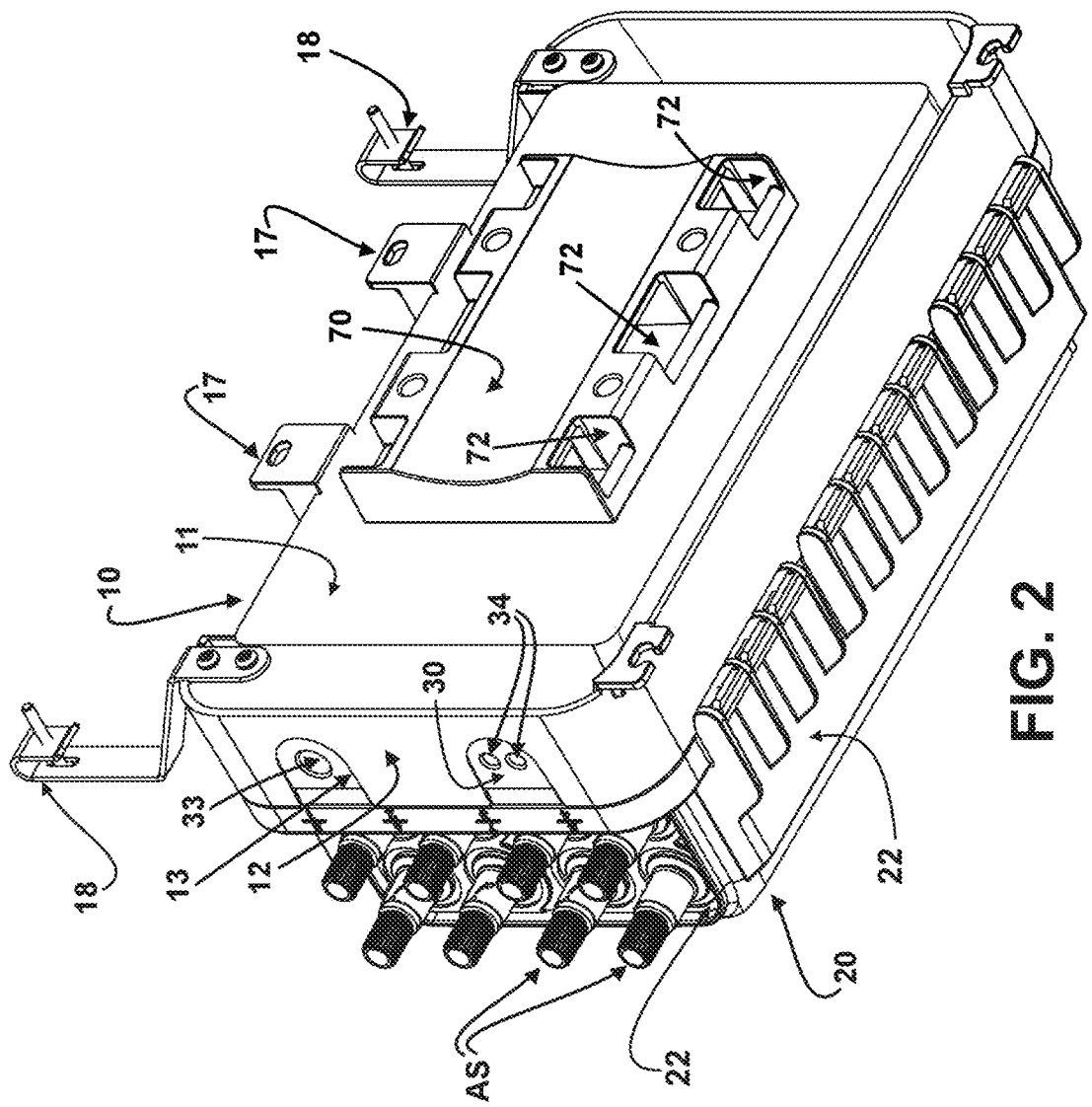
FIG. 2 represents a perspective view of the box of FIG. 1, when seen from the bottom side of the base that is provided with a concave cradle for fixing the box, in the vertical position, on a post.

As illustrated in the drawings and mentioned above, the optical termination and derivation box in question comprises a base 10 and a lid 20 hinged to the base 10, both in electrically non-conductive material, with the base 10 incorporating, in one piece, a bottom wall 11 and peripheral walls 12 defining a leading edge 12*a*. The lid 20 has a top wall 21 and peripheral walls 22 defining a trailing edge 22*a* that carries a sealing gasket 24, generally of elastomer.

At least one peripheral wall 12 of the base 10, not hinged to the lid 20, is provided, from a leading edge 12*a*, with at least two lateral openings 13, in a "U" shape and each closed by a sealing grommet 30, made of elastomer, for the tight passage of at least one multi-fiber optical cable CO. The optical CO cable can be defined by a multi-fiber distribution cable or by one or more multi-fiber termination (drop) cables of different diameters.

Each sealing grommet 30 has a first leading edge portion 31a recessed from the leading edge 12a of the base 10, and a second leading edge portion 31b leveled with the leading edge 12a, each sealing grommet 30 being pressed into its respective lateral opening 13 by a shoe 50, for example of plastic, seated on the first leading edge portion 31a of the grommet 30 and secured by clamping means 55, for example in the form of screws, on the leading edge 12a of the base 10.

The sealing gasket 24 is seated and pressed on the second leading edge portion 31b of the grommet 30 and on the leading edge 12a of the base 10, when the lid 20 is closed against the base 10. The trailing edge 22a of the lid 20 can take the form of a channel in which the sealing gasket 24 is partially housed and retained, as illustrated in the drawings.

In the illustrated construction, each lateral opening 13 is flanked by two inclined recesses 13a, the second leading edge portion 31b of each grommet 30 incorporating two opposite lateral flaps 31c which projects outwardly from the contour of the sealing grommet 30, anteriorly coplanar to the first leading edge portion 31a and which define, each one and posteriorly, an inclined surface 31d to be seated in a respective inclined recess 13a of the leading edge 12a, and the sealing gasket 24 being seated and pressed onto the two lateral flaps 31c of each sealing grommet 30 when the lid 20 is closed against the base 10.

The lateral flaps 31c on the second leading edge portion 31b of each sealing grommet 30 have their inclined surface 31d seated on a respective inclined recess 13a of the leading edge 12a of the base 10 and pressed against said inclined recess 13a by the gripping actuation of the shoe 50 and also by the seating of the gasket 24, providing a high degree of tightness in the region of assembly of the sealing grommets 30 and in the seating region between the base 10 and the lid 20.

In some embodiments and as illustrated, each shoe 50 incorporates opposite and coplanar end portions 51 which project beyond the width of each lateral opening 13 and which are each provided with a through hole 51a, the leading edge 12a of the base 10 being provided with a recessed step 13b on each side of a lateral opening 13 adjacent to an inclined recess 13a and provided with a threaded hole 13c.

Each recessed step 13b receives the seating of an end portion 51 of a respective shoe 50, the through hole 51a of each end portion 51 being passed through by a clamping means 55, in the form of a screw, inserted and fixed in the threaded hole 13c of the recessed step 13b.

Still in accordance with the illustrated construction, the inclined recesses 13a are positioned radially internal to the adjacent recessed steps 13b on the leading edge 12a of the respective peripheral wall 12 of the base 10, so that the cooperating lateral flaps 31c of the second leading edge portion 31b of each sealing grommet 30 are aligned with a respective extension of the sealing gasket 24.

For secure radial locking of each sealing grommet 30 within a respective lateral opening 13, the sum of the width of each inclined recess 13a and the width of the adjacent recessed step 13b should be less than the width of the peripheral wall 12 of the base 10 in the region of each lateral opening 13.

To ensure that each sealing grommet 30 completely seals the cross section, not occupied by an optical cable CO, of each respective lateral opening 13 into which it is fitted, they are provided with transversal holes 33, 34, having one or more diametrical patterns and having one of the ends originally closed by a respective tearable lateral wall portion 35. It is sufficient for said tearable lateral wall portion 35 to be easily removed to allow the passage of a multi-fiber optical cable CO through the respective transversal hole 33, 34, to enter into the box or to leave therefrom.

Figure 6:
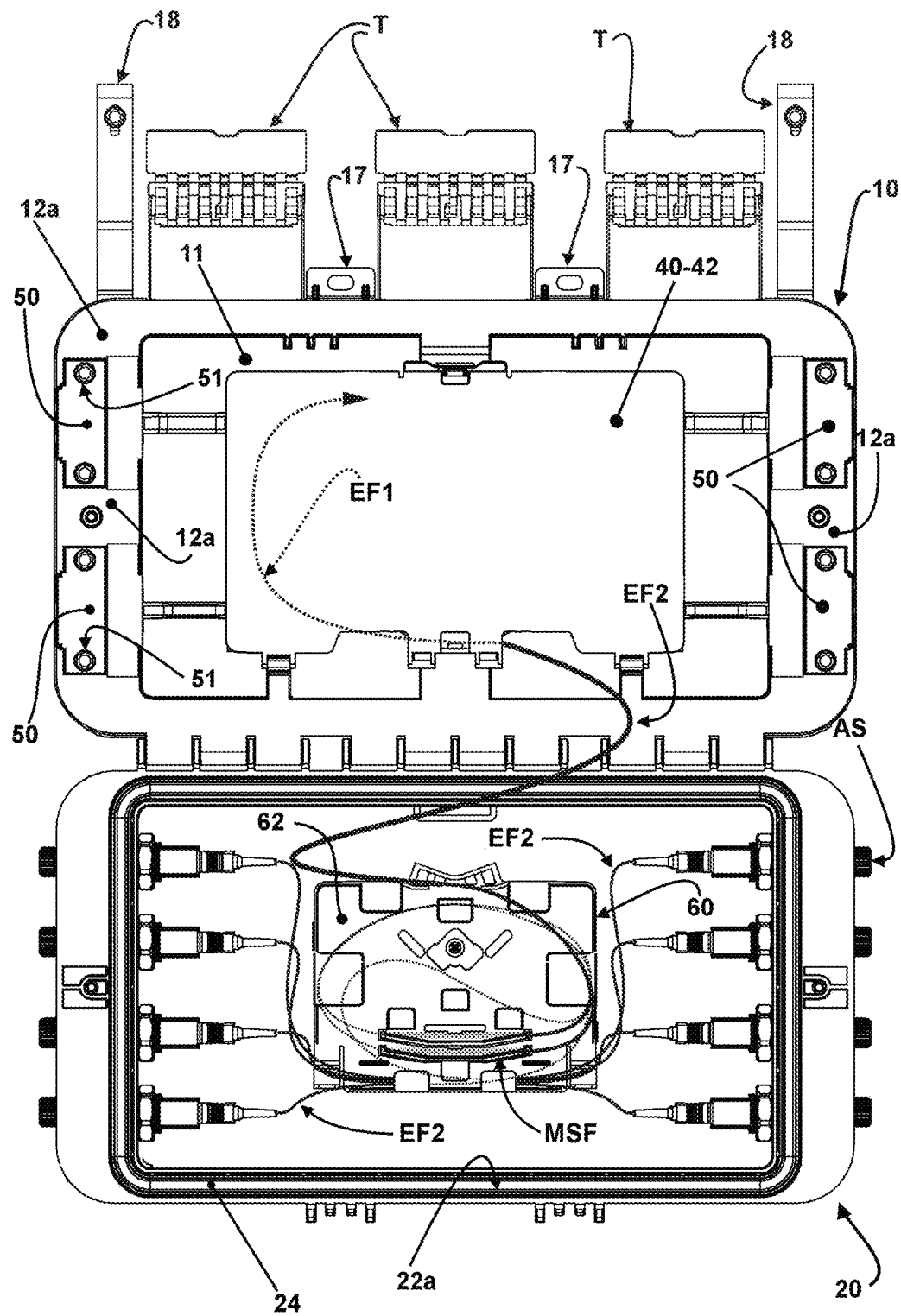
FIG. 6 represents a plan view of the inside of the box in the open condition, with the assembly of fusion trays seated on the base, with the splitter accommodation tray fixed inside the lid, but with the splitter protective plate removed from the lid, said view illustrating also the inner end of the output adapters and the routing of fiber extensions between the output adapters and the hinged fusion trays within the base.
Figure 7:
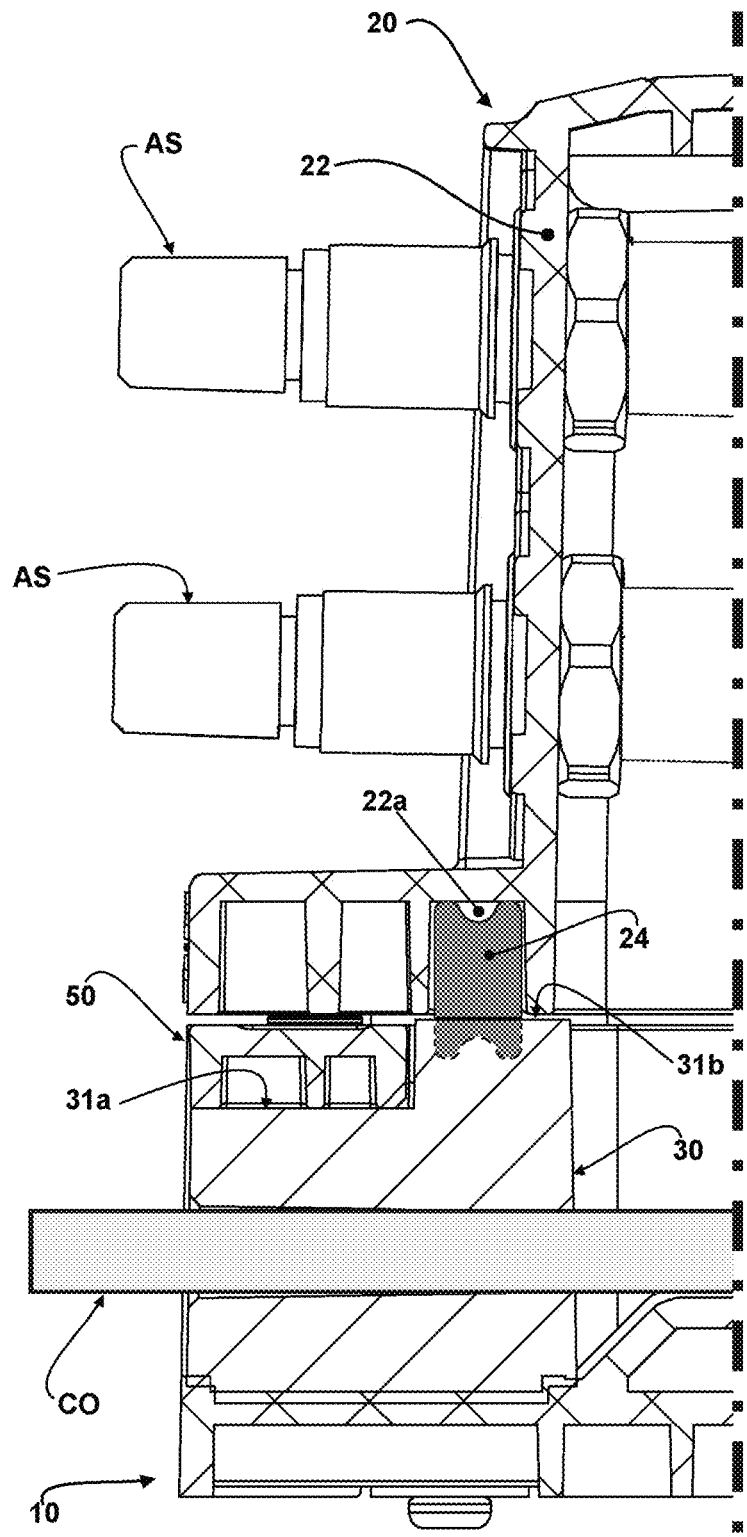
FIG. 7 represents a partial cross-sectional view of the termination and derivation box, in the closed condition and illustrating the sealing grommet acting on a distribution or derivation cable and also the sealing between the lid and the base.

According to a second aspect of the present disclosure, the box in question further comprises a splitter accommodation tray 60 having an front face 61 secured against top wall 21 of lid 20 and carrying splitter and/or fiber accommodation means MSF, and a rear face 62 which is covered by a splitter protector plate PS, secured inside the lid 20 and which protects the splitter and/or fiber accommodation means MSF (FIG. 6).

Each splitter and/or fiber accommodation means MSF is connectable, on the one side, to a fiber extension EF1 derived from an optical cable CO received at the base 10 and, on the other side, to split fiber extensions EF2 held at the side of the front face 61 and connectorized to output adapters AS passing through at least one of two opposite peripheral walls 22 of the lid 20, not hinged to the base 10, the output adapters AS being externally connected to respective connectors C of a terminal cable CT external to the box.

In addition to any of the aspects of the present disclosure, defined by the assembly of the sealing grommets 30 and the assembly of the division tray 60 with protection of the optical divisions, the box in question carries, internally, at least one fusion tray 40, hinged to the base 10 and incorporating fiber fusing means FF and fiber extension accommodation means AF. The at least one fusing tray 40 has a front face 41 facing the lid 20 and a rear face 42 carrying fiber fusing means FF and fiber strand accommodation means AF. The at least one fusion tray 40 is displaceable between a first position seated on the base 10 and a second position in which it exposes, to the operator, the fusion means FF of fiber extensions EF1.

In the exemplified construction, at least two overlapping fusion trays 40 are provided, with the most rear one being hinged to the base 10 and the front ones being hinged to the one immediately posterior. In order to maintain a stable positioning of the fusion trays 40 inside the box, the base 10 incorporates, internally, a locking tongue 19, elastically deformable from an operative position, in which it locks the rear fusion tray 40 in its first position seated on the base 10, to an inoperative position, in which it releases the angular displacement of the fusion tray 40 from the first position to the second position.

The base 10 also incorporates, in the region of its peripheral wall 12 for hinging the lid 20, a pair of engaging means 16 to which are detachably hinged, with elastic deformation, two hinge tabs 46 incorporated to an edge of the tray 40, adjacent to the hinge axis of the lid 20.

The engaging means 16 facilitate work on the rear face 42 of the fusion tray 40 when the box is installed vertically. With this, it is possible for the operator/installer to detach the fusion trays 40 from the base 10, to work on the rear face 42 of said trays on a work platform mounted, in an elevated way, next to a strand, to a wall of a building or to a post. This feature is particularly useful when the box is mounted horizontally.

With the proposed construction, it is possible for an installation team to carry out fusion splices of an optical fiber using the rear face 42 of one or more fusion trays 40, which can be individually and jointly taken to their second position in which they define a kind of horizontal table, when the box is mounted on a strand or in a building, with the lid articulated to an horizontal position.

Figure 3:
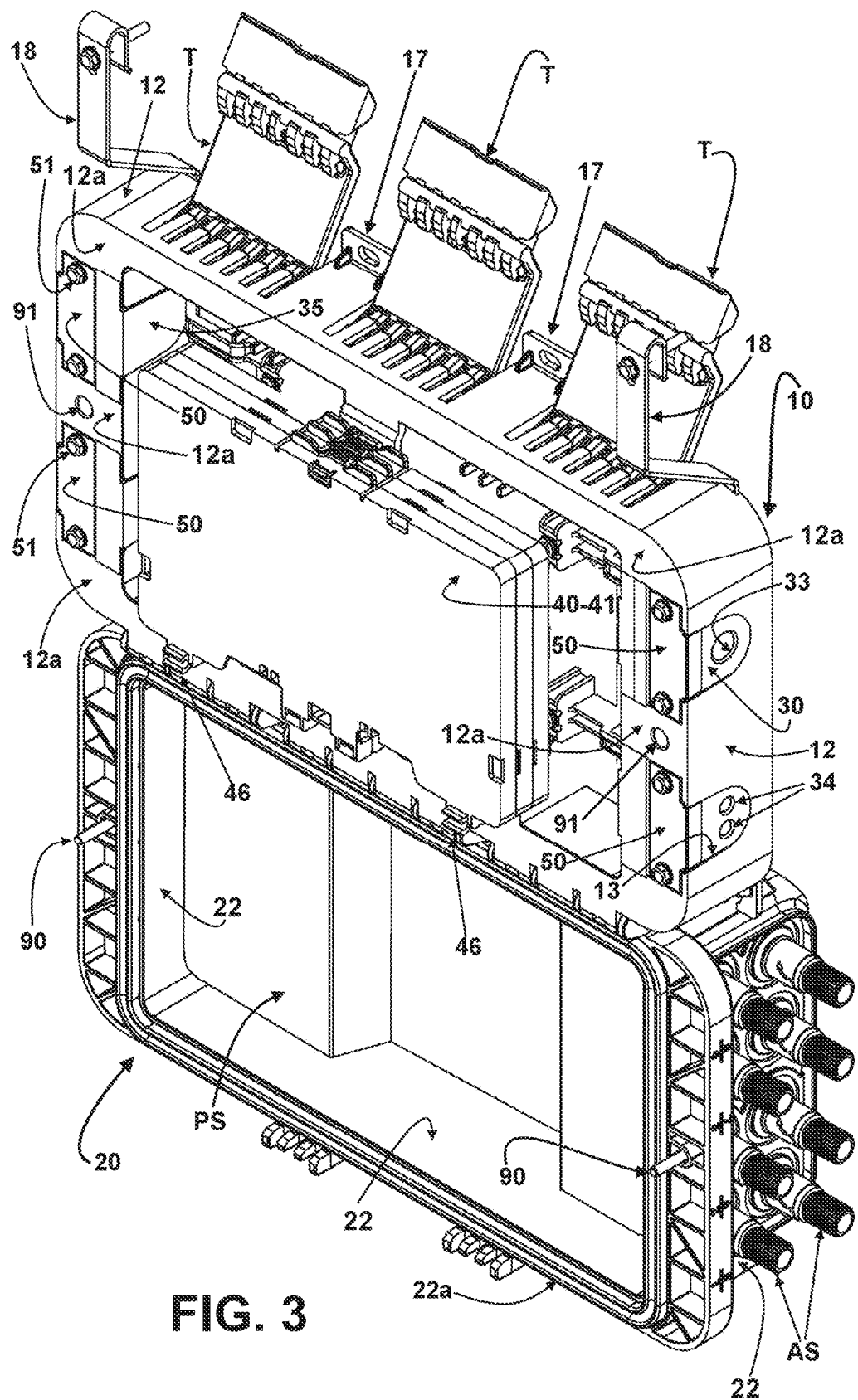
FIG. 3 represents a perspective view of the box of FIGS. 1 and 2, when in a horizontal mounting condition, with the lid in the open condition, with a splitter accommodation tray fixed (in an invisible way) inside the lid and behind a protective plate of splitter in opaque material, with fusion trays seated in the base and at the opposite lateral of the lid, each one carrying output adapters, projecting outwardly from the box, for connection of termination cables ("drop" cables)
Figure 4:
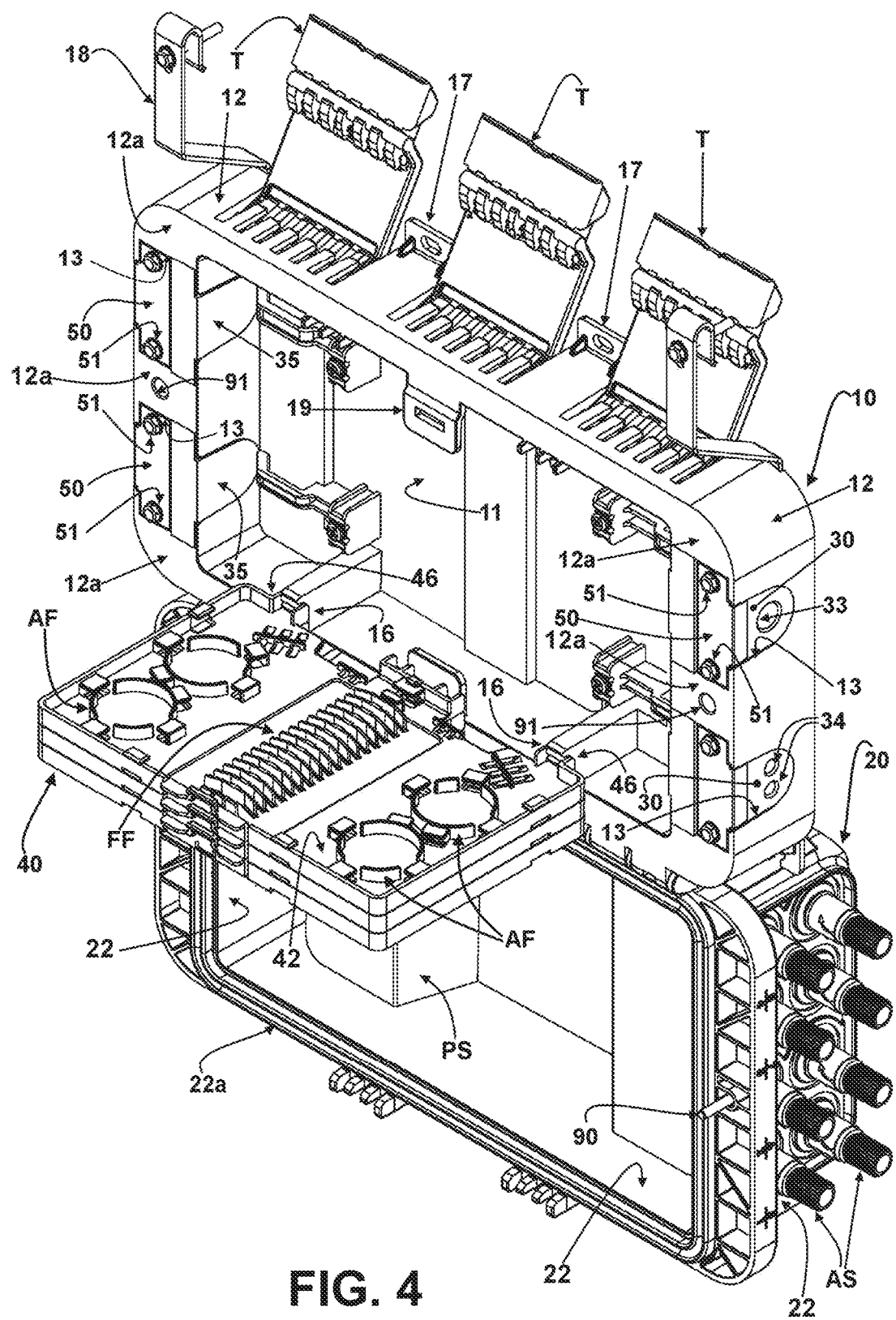
FIG. 4 represents a perspective view of the box of FIG. 3, with the lid in the open condition and the fusion trays angularly displaced together to a position in which each of them can expose to the installer its rear face each carries fiber fusion means and fiber extension accommodation means.
Figure 5A:
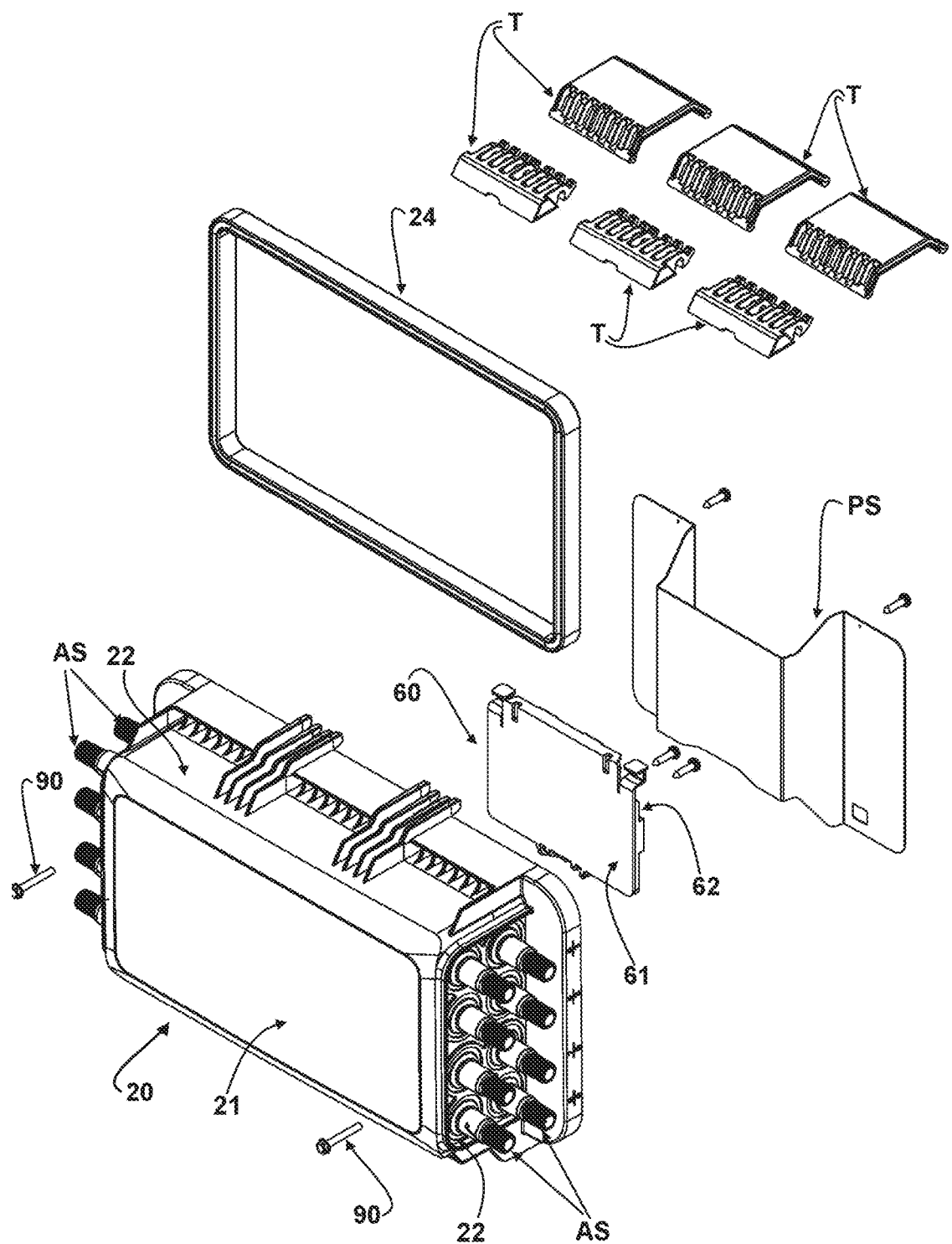
FIG. 5A represents an exploded, reduced-scale perspective view of a first group of the termination and derivation box components associated to the lid.
Figure 5B:
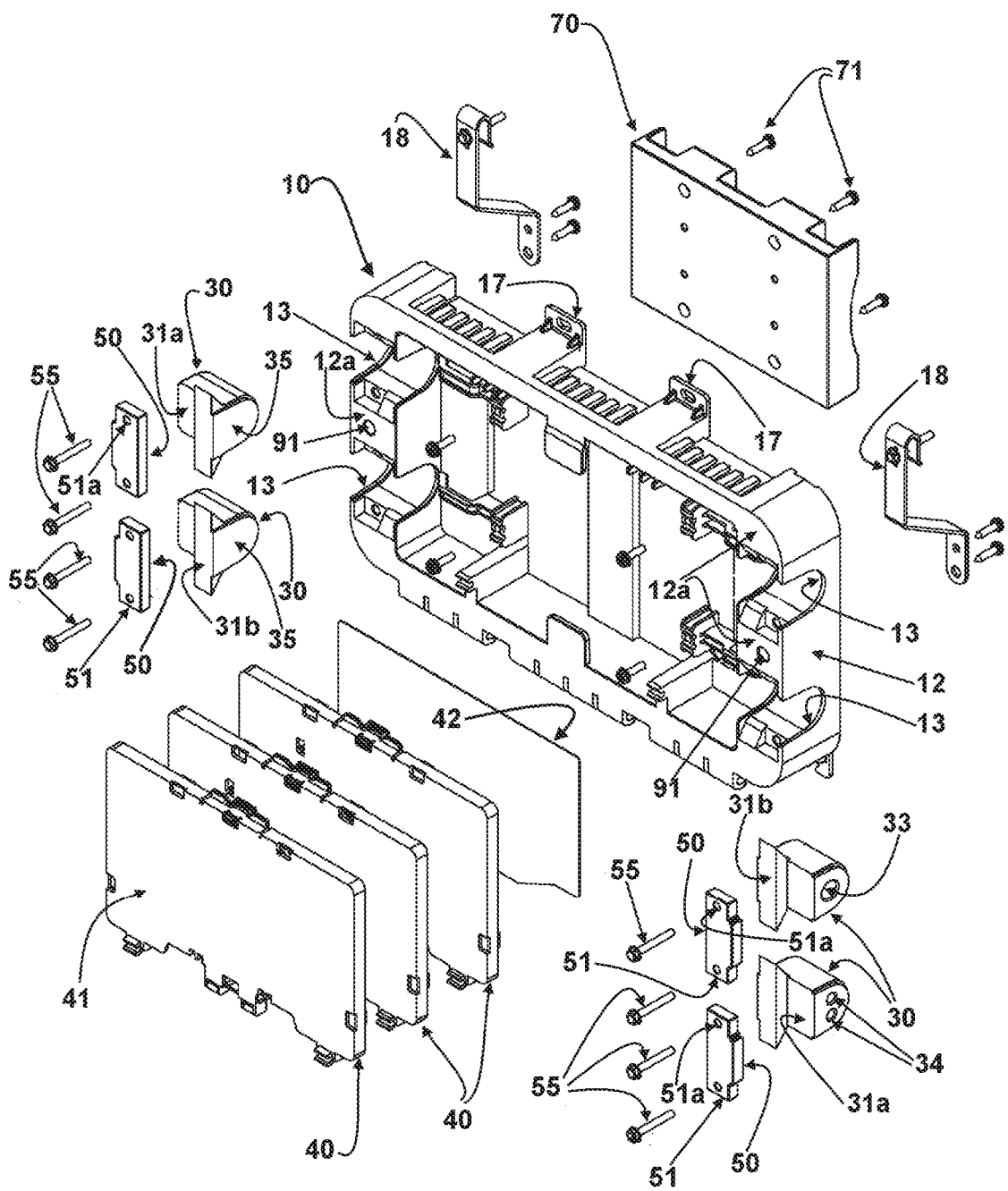
FIG. 5B represents an exploded, reduced-scale perspective view of a second group of termination and derivation box components associated to the base.
Figure 5C:
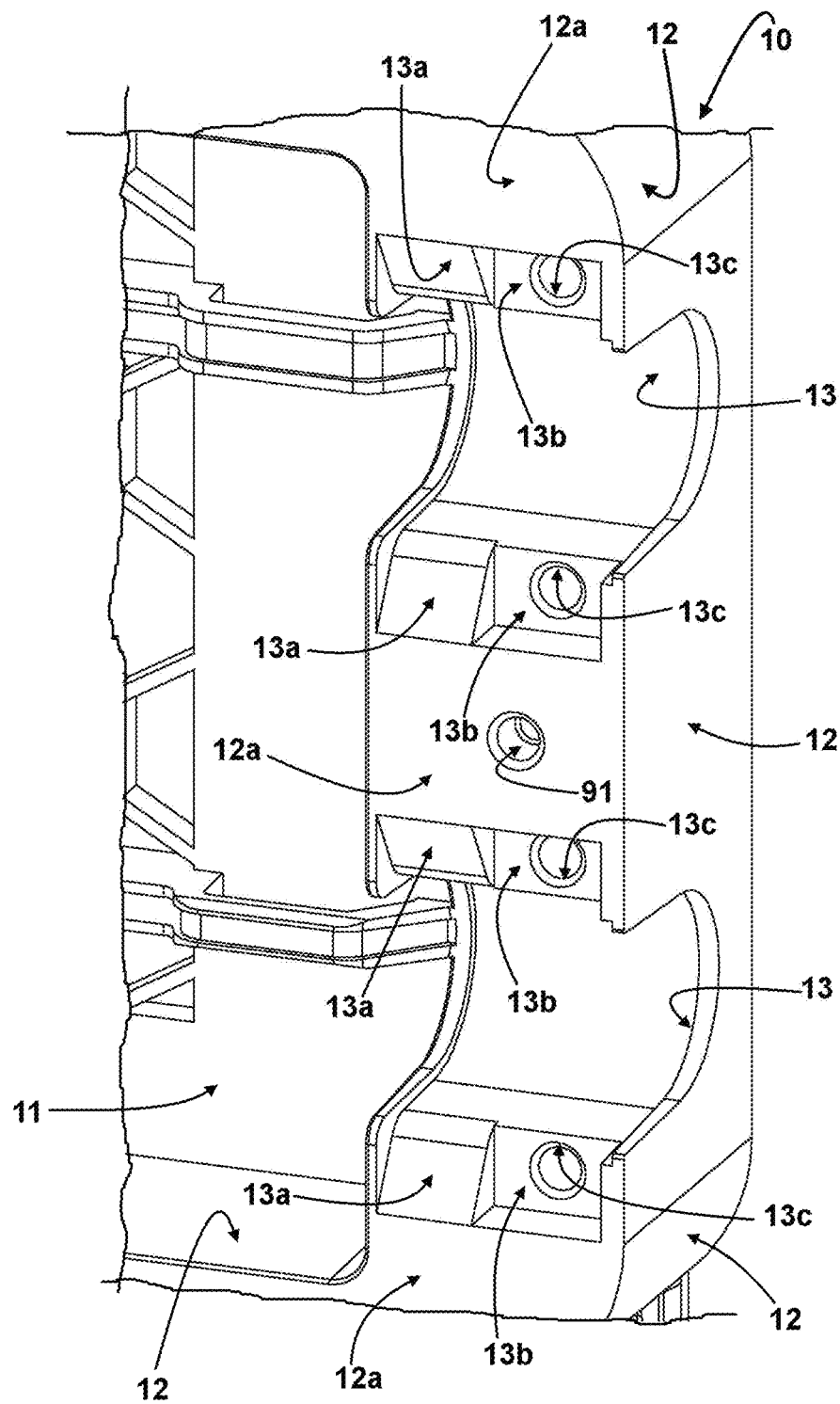
FIG. 5C represents an enlarged detail of the right side region of the base illustrated in FIG. 5B.
Figure 5D:
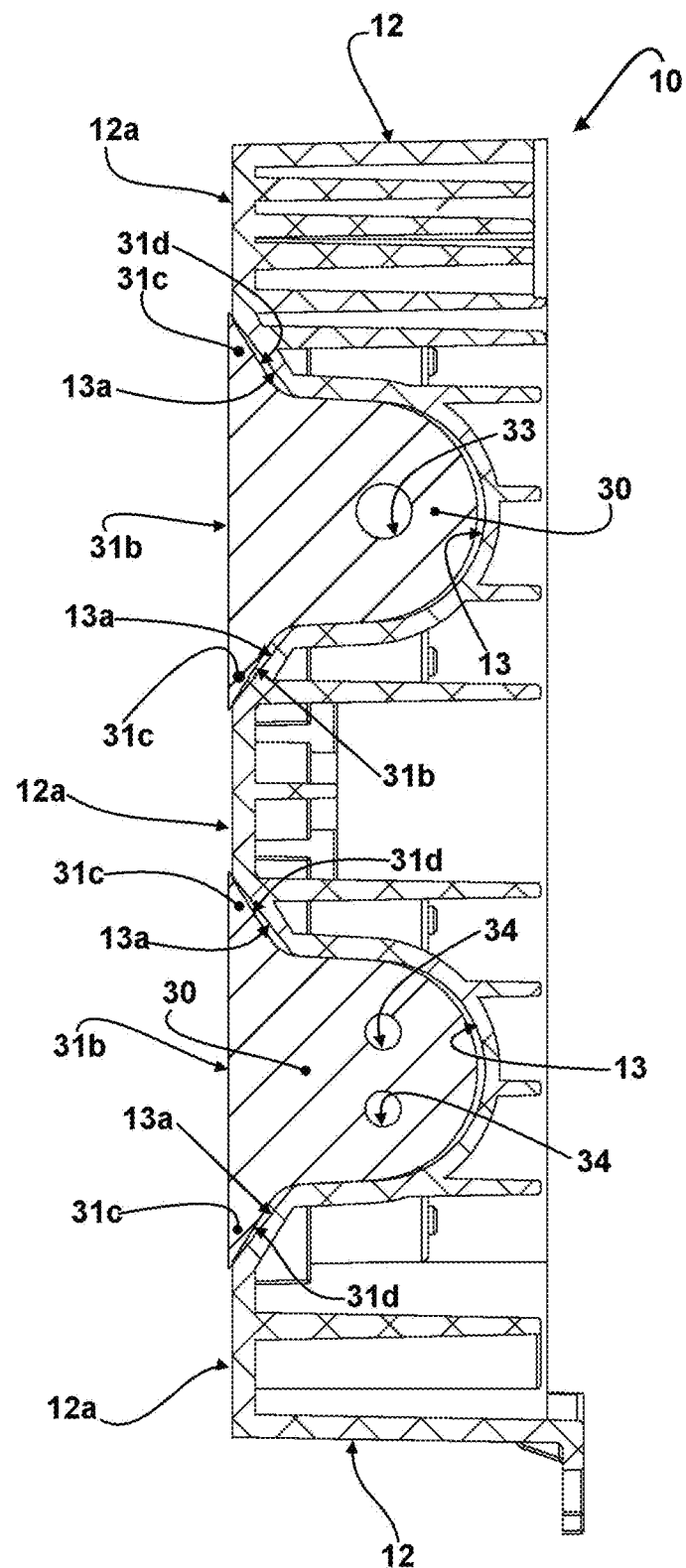
FIG. 5D represents a sectional view of the right side region of the base and taken along the line VD-VD in FIG. 6.
Figure 5E:
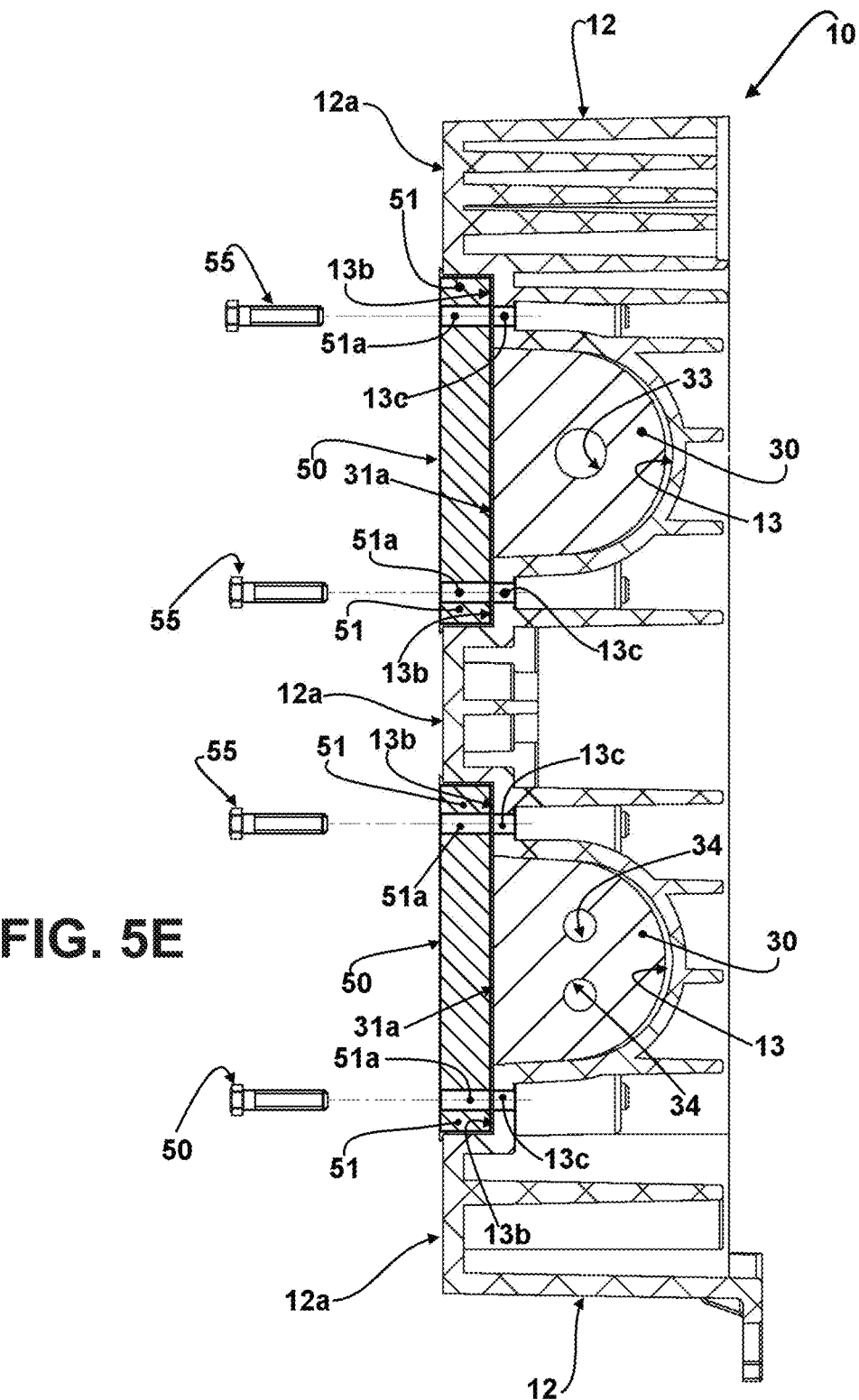
FIG. 5E represents a sectional view of the right side region of the base and taken along the line VE-VE in FIG. 6.

When the box is mounted with the hinge axis of the lid in a vertical position, the rear face 42 of the fusion trays 40 remain in a vertical plane when the tray is moved to its second position illustrated in FIG. 3. In this case, the team involved with splices or optical divisions can simply move the tray 40 to its second position and work on the rear face 42, without risk of producing damage to the connections of the cables CO and to the fiber extensions EF2.

As illustrated, the bottom wall 11 of the base 10 is usually arranged in a vertical mounting plane to remain mounted on a strand (not shown) by means of suspension hooks 18, which are detachably secured to the base 10 and which can take different constructions, like the one illustrated by way of example.

However, the suspension hooks 18 can be removed when the box has the external face of the bottom wall 11 of the base 10 directly fixed against a building wall, with the hinge axis positioned vertically or horizontally, by means, for example, of screws (not shown) passing through lateral flaps 17 incorporated laterally and externally to the base 10, or even against a post with the hinge axis of the lid 20, arranged vertically. In the vertical assembly of the box, the latter can have its base 10 provided with the sealing grommets 30 only on its side facing downwardly or have sealing grommets provided on both sides, but with only the sealing grommets, positioned on the side facing downwardly, being transpassed by multifiber optical cables CO.

When mounting the box on a post, a concave cradle 70 is provided which is externally and detachably fixed to the bottom wall 11 of the base 10, by screws 71 securable in tight housings provided in said bottom wall 11, or by other adequate detachable fixing means, the concave cradle 70 being provided with pairs of lateral openings 72, opposite two by two, for the passage of straps (not shown) for lashing the box to a post.

Particularly when mounting the box with the hinge axis of the lid 20 positioned horizontally, the trays 40 can be stabilized in their second position by partially seating them against a peripheral wall region 22 of the lid 20, adjacent to its articulation to the base 10, the lid 20 being in an open position coplanar to the base 10 and pending from the latter.

In the proposed construction, the lid 20 is locked to the base 10 by multiple locks T carried by a peripheral wall 12 of the base 10, opposite that of the hinge of the lid 20 to the base 10 and displaceable between an open position and a closed position, in which it locks the peripheral walls 12 of the base 10 and the lid 20 facing each other. It should be understood that the latches T can also be pivotally mounted to a peripheral wall 22 of the lid 20, to act against the base 10, when the box optical termination closing. In addition to the latches T, the lid 20 can be even more solidly fixed to the base 10, in the closed condition, by means of a pair of screws 90 passing through respective lateral regions of the lid 10 and threadable in holes 91 provided in the leading edge 12a of the lid base 10.

Although only one configuration of the optical termination and derivation box in question has been illustrated here, it must be understood that changes in the shape and arrangement of the components may be made, without departing from the constructive concept defined in the claims that accompany the present disclosure.

The invention claimed is:

1. An optical termination and derivation box comprising:
   a base having a bottom wall and peripheral walls defining a leading edge; and
   a lid hinged to the base, having a top wall and peripheral walls defining a trailing edge carrying a sealing gasket,
   wherein a leading edge of at least one peripheral wall of the base is provided with at least two lateral openings, in a U shape and each closed by a sealing grommet, for a tight passage of at least one multi-fiber optical cable and having a first leading edge portion, the first leading edge portion defining a first planar surface, recessed with respect to the leading edge of the base, and a second leading edge portion defining a second planar surface leveled with the leading edge, the second leading edge portion extending from the first planar surface of the first leading edge portion, each sealing grommet being pressed into the lateral opening by a shoe seated on the first leading edge portion of the grommet and fixed, by clamping means, on the leading edge of the base, the sealing gasket being seated and compressed on the second leading edge portion of the grommet when the lid is closed against the base.

2. The box according to claim 1, wherein each lateral opening is flanked by two inclined recesses, with the second front edge portion of each grommet incorporating two lateral flaps, opposite and projecting outwardly from the contour of the sealing grommet, anteriorly coplanar to the first leading edge portion and each posteriorly defining an inclined surface to be seated in a respective inclined recess of the leading edge, and the sealing gasket being seated and compressed on the two lateral flaps of each sealing grommet when closing the lid against base.

3. The box according to claim 2, wherein each shoe incorporates opposite and coplanar end portions that project beyond a width of each lateral opening and which are provided, each one, with a through hole, the leading edge of the base being provided with a recessed step on each side of a lateral opening, adjacent to an inclined recess and provided of a threaded hole, each recessed step receiving a seating of an end portion of a respective shoe, the through hole of each end portion being transpassed by the clamping means in the form of a screw inserted and fixed in the threaded hole of the recessed step.

4. The box according to claim 2, wherein the inclined recesses are positioned radially internal to the adjacent recessed steps on the leading edge of the respective peripheral wall of the base.

5. The box according to claim 4, wherein a sum of a width of each inclined recess and a width of the adjacent recessed step is less than a width of the peripheral wall of the base in a region of each lateral opening.

6. The box according to claim 1, wherein each sealing grommet is provided with transversal holes, presenting one or more diametrical patterns and having one of the ends originally closed by a respective tearable sidewall portion of the sealing grommet.

7. The box according to claim 5, wherein the base incorporates, in a region of the peripheral wall to which is hinged the lid, a pair of engaging means in which two hinge tabs incorporated in an edge of a fusion tray adjacent to a hinge axis of the lid are detachably hinged with elastic deformation.

8. The box according to claim 7, wherein the box is mounted on a strand, in a position with the hinge axis of the lid positioned horizontally, by a pair of suspension hooks, detachably secured to the base.

9. The box according to claim 8 further comprising a concave cradle externally and removable fixed to the bottom wall of the base and provided with pairs of lateral openings, opposite two by two, for a passage of straps for lashing the box to a post.

10. The box according to claim 9, wherein multiple latches carried by a peripheral wall of the base, opposite to that to which the lid is hinged to the base and displaceable between an open position and a closed position, in which the multiple latches locks, to each other, peripheral walls of the base and the lid facing each other.

11. The box according to claim 1, wherein the box carries, internally, at least one fusion tray, hinged to the base and incorporating fiber fusion means and fiber extensions accommodation means, the at least one fusion tray having a front face facing the lid and a rear face carrying fiber fusion means and fiber extensions accommodation means, the at least one fusing tray being displaceable between a first position seated on the base and a second position in which it exposes, to the operator, the fusing means of fiber extensions.

12. The box according to claim 1 further comprising a concave cradle externally and removable fixed to the bottom wall of the base and provided with pairs of lateral openings, opposite two by two, for a passage of straps for lashing the box to a post.

13. The box according to claim 12, wherein multiple latches carried by a peripheral wall of the base, opposite to that to which the lid is hinged to the base and displaceable between an open position and a closed position, in which the multiple latches locks, to each other, peripheral walls of the base and the lid facing each other.

14. The box according to claim 1, wherein the second leading edge portion extends continuously across the first leading edge portion.

* * * * *